Patented Apr. 20, 1948

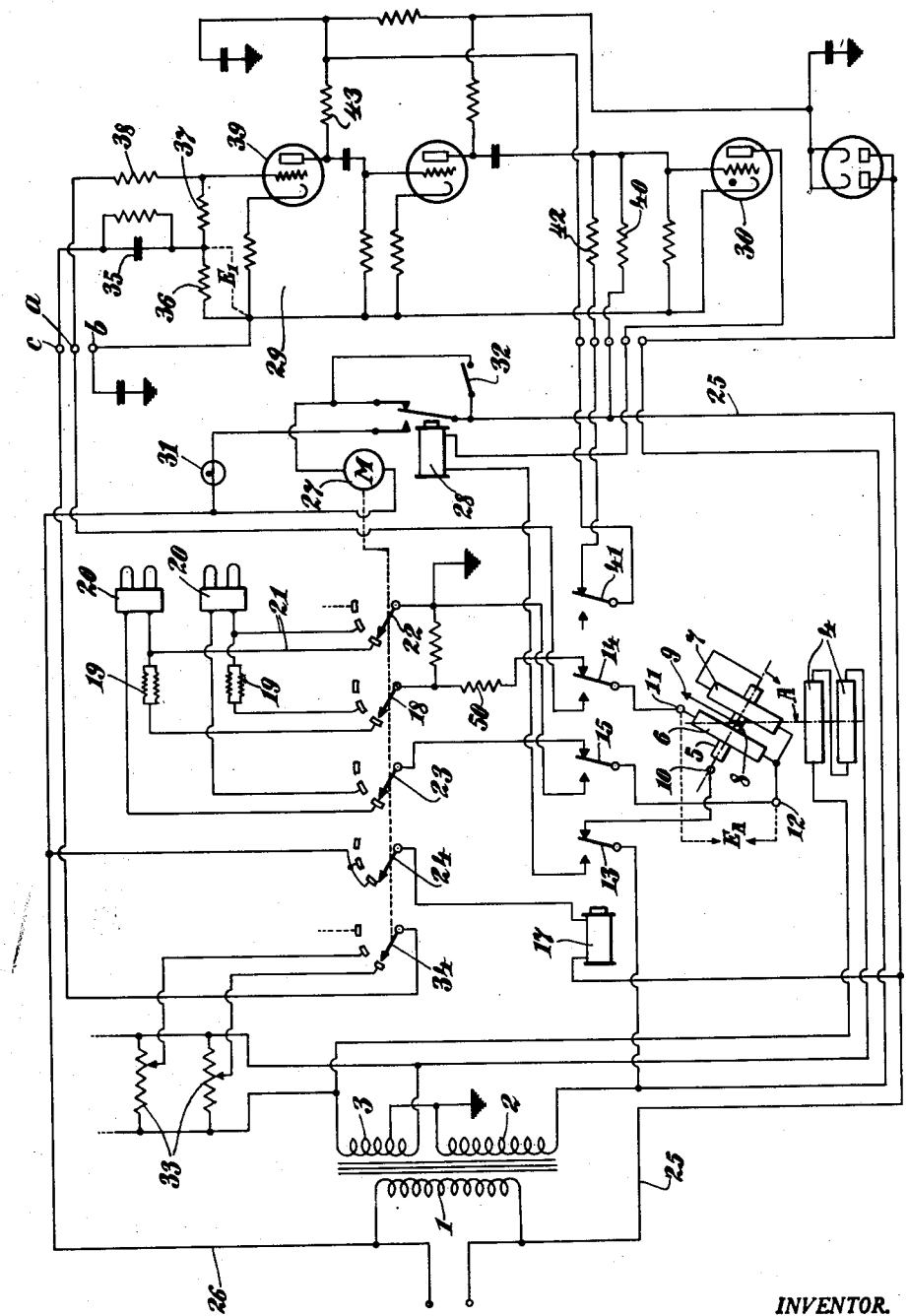

2,440,002

UNITED STATES PATENT OFFICE 2,440,002

SELECTIVE METERING SYSTEM WITH SUPERVISED CONTROL DEVICE

John L. Bower, New Haven, Conn., assignor to Control Instrument Company, Inc., Brooklyn, N. Y., a corporation of New York Application November 26, 1946, Serial No. 712,281

4 Claims. (Cl. 177—311)

This invention relates to improvements in metering systems and has particular reference to a circuit therefor for controlling alarm or signalling devices, servo mechanisms and the like.

Various methods of securing control action in metering systems have heretofore been proposed. One such method involves the use of a reflecting surface affixed to the movable coil of such a system so that reflected light will actuate photo-tube control networks. A second method utilizes mechanical or pneumatic linkages loosely coupled to the movable coil to transmit the control signal or impulse. A third method employs special auxiliary movable coils to vary the inductance of a correlated system with such variation constituting the control signal, and a fourth procedure utilizes the influence of eddy currents induced by a movement of a fin constructed of inductive material.

In the present system, it is proposed, by periodically switching from an indicating to a control condition in the system, to employ the mutual induction between elements of a meter, such as fixed and movable coils thereof, for effecting the transmission of a control impulse. This suggested procedure has the advantages of materially simplifying the system elements in that the movable coils require no attachments to enable the transfer of control intelligence; of substantially reducing calibration difficulties since the control circuit calibration can be made to coincide with the initial calibration of the meter; of making the system as a whole inherently independent of large variations in power supply voltage and frequency; and of enabling cyclic inspection of a multiplicity of measuring circuits.

The inventive idea involved is capable of receiving a variety of expressions one of which, for purposes of illustration, is shown in the accompanying drawing, but it is to be expressly understood that said drawing is utilized only to facilitate the description of the invention as a whole and not to define the limits thereof, reference being had to the appended claims for this purpose.

The drawing is a diagrammatic view of a metering system embodying the features of the present invention and showing the circuit in an indicating or measuring condition.

The circuit of the present invention is shown in its adaptation to a salinity indicating system, similar to that illustrated in the United States Letters Patent to Ellis, #2,306,691, dated December 29, 1942. Briefly, such a system comprises a line transformer consisting of the primary 1 which is connected to a source of alternating current and the high and low voltage secondaries 2 and 3 of like frequencies. The meter proper comprises the fixed field coils 4 connected to the secondary 3 of the transformer and constantly maintained energized thereby. Said meter further comprises a movable coil assembly consisting of a coil 5 and the parallel coils 6 and 7 at right angles to said coil 5, all said coils being connected in series and rigidly joined together so that they will rotate as a unit about the axis 8 of the movable coils 5, 6 and 7 to thus move the pointer 9 carried by the coil 5 over a suitable indicating scale. When the present system is in indicating condition, as shown, the terminals 10 and 11 of the movable cross coils are in series connection with the grounded transformer secondary 2 through the back contact of the armature 13 of a relay 17, which is now de-energized, the windings of the various coils, the back contact of the armature 14, a resistor 50, and the arm 18 of a rotary switching device utilized to effect a change-over from indicating to control condition, as will later appear, then through the temperature compensating resistors 19 associated with the particular one of a group of salinity cells 20 which happens to be connected to the meter through said arm 18, and then to ground potential over the conductor 21 and the switch arm 22. The coils 5 and 7 are additionally included in a second series circuit extending from the terminal 12 through the back contact of the armature 15, the switch arm 23, the salinity cell 20, and thence to ground over the conductor 21.

In such a metering system, should the conductivity of one of the salinity cells 20 increase, due to an increase in the saline content of the liquid being measured, the reaction between the fixed and movable coils of the meter will cause the movable coils to align themselves at some angle A with respect to the axis of the fixed coils, as fully explained in said patent. It is a characteristic of the movable coil assembly of a meter of the power factor type, such as shown, that when said assembly is properly balanced and not energized, it will remain at any arbitrary position, such as the angle A, for prolonged periods after sufficient time has elapsed for the pointer 9 to maintain a steady orientation.

In accordance with the present invention, it is proposed to disconnect the meter periodically from its associated metering circuits by some means such as the switching device previously referred to and, while so disconnected, to use the voltage mutually induced between the fixed and movable coils of said meter while it is in measuring condition to effect the transmission of an impulse for controlling visual or audible signals, servo mechanisms and other like devices in such manner as to operate the same if the resultant current is of sufficient strength.

To accomplish the cyclic operations of the system and thereby obtain alternate indicating and control conditions, the rotating arm 24 of said switching device is not in engagement with its terminals when the system is in indicating condition, but will contact one of said terminals as rotation of the switching device is continued and after one of the cells 20 of the system has been connected to the meter and the indicator 9 thereof has assumed a stable position. When the arm 24 engages one of its terminals, an obvious circuit for the relay 17 is closed through the arm 24 to the power supply, and said relay energizes to close its front contacts, thus switching the system to a control condition in which the voltage induced in the coils of the meter is utilized to control a signal or the like. The switching device is operated by a motor 27 which derives its current from the line conductor 25 through the back contact of relay 28 and from thence to the conductor 26. The motor continues to operate until a dangerous condition exists in one of the metering circuits, such as when the conductivity of the liquid being measured increases beyond some predetermined value. When this occurs, the increased voltage through the electrodes of the salinity cell causes the movable coil assembly of the meter to turn clockwise and thus decrease the angle A. The resultant voltage derived from such condition produces, as will later appear, an output from the amplifier, generally indicated at 29, which closes an energizing circuit for relay 28 extending from the plate element of the output tube 30 through the winding of said relay, and the front contact of the armature 13 to the grounded transformer secondary 2. Relay 28 energizes in this circuit to stop the motor and, through its front contact, closes the signalling or control circuit connected to the line conductors 25, 26, and including a signal or other device conventionally shown at 31. After due cognizance has been taken of the existing danger, a momentary closure of the push button switch 32 will close an auxiliary circuit for the motor 27 to again start the same so as to rotate the switch device to open the circuit of the relay 17 and then engage its arms with the next set of terminals. When the relay 17 de-energizes to open the front contact of its armature 13, the energizing circuit for relay 28 is also opened and said relay then releases to again establish the main operating circuit for said motor. The opening of the front contact of relay 28 breaks the circuit for the signal 31 which then de-energizes.

The voltage induced in the movable coil assembly, when in its indicating condition, is a function of the angle thereof relative to the fixed coils 4. Since the latter are constantly energized, the mutual inductance between them and the movable coils causes a voltage $E_A$ to appear across the terminals 11 and 12 and said voltage will be proportional to the cosine of the angle A. Thus, when the relay 17 is energized, this voltage will be applied through the front contacts of armatures 14 and 15, to the terminals $a$ and $b$ of the control amplifier 29 and thus to the grid of the input tube 39. For each value of angle A there corresponds a unique value of $E_A$. However, it is obvious that there exists two positions, A and −A of the meter in which an induced voltage of equal magnitude and opposite sign would appear. In order to remove this source of ambiguity, there is superimposed upon the voltage $E_A$ an auxiliary voltage indicated at $E_1$ across the terminals $b$ and $c$ of the amplifier and which is made to be approximately in phase with the movable coil voltage. For any given value of $E_A$ corresponding to a limiting value of the concentration of the fluid being measured, the magnitude and sign of voltage $E_1$ is adjusted by one of the potentiometers 33 connected to the transformer secondary 3 and through the switch arm 34 to the terminal $c$ of the amplifier, and the phase relative to voltage $E_A$ is adjusted to approximately 180° by a suitable network including the condenser 35 and the resistances 36, 37 and 38. The net voltage appearing at the grid of the tube 39 is then $E_A - E_1 = 0$ at the angle A, and at angle −A the net voltage $E_A - E_1$ would be $$(-E_A) - E_1 = -2E_A$$

and no ambiguity would exist. Hence, the resultant magnitude and phase of the impressed grid voltage determines the plate output of the amplifier.

The amplitude of the induced coil voltage is proportional to the fixed coil voltage and to the line voltage and thus the amplifier input voltage will reflect line voltage changes. However, by making the gain of the control amplifier great enough, the circuit may be rendered inherently independent of variations in said line voltage. Further, any phase correcting network such as 35, 36, 37, 38 is needed only to correct phase differences due to any given meter coil system and such a network may be made to maintain proper phase correction despite a given variation in line frequency.

Switching of the meter to and from indicating and control conditions may give rise to the generation of transient voltages which, if they are of proper instantaneous polarity, may have the undesirable consequence of creating "false alarms." To prevent this and to assure stable operation of the circuit, the grid of the output tube 30 is connected, through a resistor 40, to the conductor 25 and also, through the back contact of armature 41 of relay 17 and a pair of current limiting resistors 42 and 43, to the plate of the input tube 39. The breaking of this circuit, at 41, when a switching operation takes place, produces a transient voltage such as will delay the response of tube 30 until a stable condition is attained by the remainder of the circuits and the transient due to meter switching has disappeared.

What is claimed is:

1. The combination with a plurality of metering circuits, and a meter including fixed and movable coils adapted for connection to said circuits and having mutual induction between the coils thereof during a metering operation; of a controlled device, a control circuit therefor, periodically operable means for switching said coils from the metering circuits to said control circuit to connect to the latter the voltage induced in said coil assembly, and means responsive to an increase in said voltage in excess of a predetermined value for energizing said control circuit to operate said device.

2. The combination with a plurality of metering circuits, and a meter therefor including fixed and movable coils connected to said circuits and having mutual induction therebetween during a metering operation; of a controlled device and a control circuit therefor, a switching device for alternately connecting and disconnecting said meter to and from successive metering circuits, means operable when said meter is disconnected from one of its circuits for connecting to said control circuit, through said switching device, the voltage induced in coils of said meter, and means to energize said control circuit to operate its device when said voltage is in excess of a predetermined value.

3. The combination with a plurality of metering circuits, and a meter therefor including fixed and movable coils connected to said circuits and having mutual induction therebetween during a metering operation; of a controlled device and a control circuit therefor, a switching device for alternately connecting and disconnecting said meter to and from successive metering circuits, an amplifier having a resistance network associated therewith, means operable to connect the voltage induced in coils of said meter through said switching device to said network, an individually adjustable potentiometer for each metering circuit also connected to said network through said switching device, and means operable when said switching device is disconnected from said meter to energize said control circuit to operate its device when said voltage is in excess of a predetermined value.

4. The combination with a plurality of metering circuits, and a meter therefor including fixed and movable coils connected to said circuits and having mutual induction therebetween during a metering operation; of a controlled device and and a control circuit therefor, an amplifying circuit, switching means cyclically operating to connect said metering circuits to said coil assembly and to connect the latter to said amplifying circuit for transferring voltage induced in one of said coils to said circuit, means to produce an output retarding transient in said amplifying circuit to delay its response to said metering circuits, after switching has occurred, until a stable condition in the metering circuits has been attained, and means controlled by said amplifying circuit to energize said control circuit to operate its device when said induced voltage is in excess of a predetermined value.

JOHN L. BOWER.

REFERENCES CITED

The following references are of record in the file of this patent:

UNITED STATES PATENTS

| Number | Name | Date |
|---|---|---|
| Re. 20,282 | Bernarde | Mar. 9, 1937 |
| 758,819 | Callum | May 3, 1904 |
| 1,267,214 | Hall | May 21, 1918 |
| 2,106,825 | Bernarde | Feb. 1, 1938 |
| 2,147,423 | Bernarde | Feb. 14, 1939 |
| 2,368,701 | Borden | Feb. 6, 1945 |
| 2,407,361 | Wilson | Sept. 10, 1946 |